(12) United States Patent
Minganti et al.

(10) Patent No.: US 12,195,224 B2
(45) Date of Patent: Jan. 14, 2025

(54) APPARATUS AND METHOD FOR THE PRODUCTION AND FILLING OF CONTAINERS DESIGNED TO CONTAIN FOOD

(71) Applicant: SACMI IMOLA S.C., Imola (IT)

(72) Inventors: Gianni Minganti, Imola (IT); Fiorenzo Parrinello, Medicina (IT); Alberto Di Giacomo, Imola (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 18/016,582

(22) PCT Filed: Jul. 13, 2021

(86) PCT No.: PCT/IB2021/056288
§ 371 (c)(1),
(2) Date: Jan. 17, 2023

(87) PCT Pub. No.: WO2022/013734
PCT Pub. Date: Jan. 20, 2022

(65) Prior Publication Data
US 2023/0294860 A1 Sep. 21, 2023

(30) Foreign Application Priority Data

Jul. 16, 2020 (IT) .......................... 102020000017290
Feb. 9, 2021 (IT) .......................... 102021000002801

(51) Int. Cl.
*B65B 9/04* (2006.01)
*B65B 7/16* (2006.01)
(Continued)

(52) U.S. Cl.
CPC .............. *B65B 9/042* (2013.01); *B65B 7/164* (2013.01); *B65B 61/005* (2013.01); *B65B 61/06* (2013.01); *B65B 61/12* (2013.01)

(58) Field of Classification Search
CPC ....... B65B 7/164; B65B 9/042; B65B 61/005; B65B 61/007; B65B 61/06; B65B 61/065; B65B 61/12
(Continued)

(56) References Cited

U.S. PATENT DOCUMENTS 3,766,702 A * 10/1973 Meissner et al. ....... B65B 9/042
53/559
3,911,640 A * 10/1975 Rausing ................ B65B 55/025
53/167

(Continued)

FOREIGN PATENT DOCUMENTS

DE 102006017959 A1 10/2006
DE 202008009634 U1 * 1/2009 ............. B65B 61/06
(Continued)

OTHER PUBLICATIONS

Italian Search Report for Italian Application No. 102020000017290, Date of Mailing Mar. 8, 2021, 7 pages.
(Continued)

*Primary Examiner* — Stephen F. Gerrity
(74) *Attorney, Agent, or Firm* — CANTOR COLBURN LLP

(57) ABSTRACT

An apparatus for the production and filling of food containers includes at least one device for forming a sheet made of polymeric material to provide accommodation receptacles which have at least one access opening, at least one filling unit adapted to fill, through the access opening, the accommodation receptacles with at least one type of food, and at least one sealing unit to seal the access opening with a closure film. The apparatus includes at least one device for removing portions, and at least one laser emitter for providing a weakening portion at a respective connecting edge between adjacent accommodation receptacles. The polymeric material is chosen from polyethylene terephthalate (Continued)

and polypropylene and copolymers thereof. The apparatus includes a first section which accommodates the filling unit, the sealing unit, and the device for removing portions, and a second section, separate from the first section, which accommodates the laser emitter.

17 Claims, 3 Drawing Sheets

(51) Int. Cl.
*B65B 61/00* (2006.01)
*B65B 61/06* (2006.01)
*B65B 61/12* (2006.01)

(58) Field of Classification Search
USPC .................. 53/453, 559, 329.3, 329.4, 329.5
See application file for complete search history.

(56) References Cited

U.S. PATENT DOCUMENTS

| | | | | |
|---|---|---|---|---|
| 5,069,017 | A * | 12/1991 | Fabricius | B65B 55/08 53/167 |
| 7,845,147 | B2 * | 12/2010 | Henderson et al. | B65D 1/30 53/591 |
| 2005/0252351 | A1 * | 11/2005 | Natterer | B65B 61/06 83/408 |
| 2010/0308492 | A1 * | 12/2010 | Merbach et al. | B26D 3/08 264/165 |
| 2013/0025243 | A1 * | 1/2013 | Spix | B65B 61/06 53/552 |
| 2015/0367566 | A1 * | 12/2015 | Schwab et al. | B65B 61/06 53/167 |
| 2017/0247172 | A1 | 8/2017 | Edwards et al. | |
| 2019/0106258 | A1 | 4/2019 | Sanfilippo et al. | |

FOREIGN PATENT DOCUMENTS

| | | | | |
|---|---|---|---|---|
| EP | 1939109 | A2 | 7/2008 | |
| FR | 2644425 | A1 * | 9/1990 | ........... B65B 61/065 |
| JP | 2001253404 | A | 9/2001 | |
| JP | 2016033018 | A | 3/2016 | |
| JP | 2016094207 | A | 5/2016 | |
| JP | 2016515070 | A | 5/2016 | |
| WO | 2019079588 | A1 | 4/2019 | |

OTHER PUBLICATIONS

International Search Report for International Application No. PCT/IB2021/056288, International Filing Date Jul. 13, 2021, Date of Mailing Oct. 20, 2021, 5 pages.

Written Opinion for International Application No. PCT/IB2021/056288, International Filing Date Jul. 13, 2021, Date of Mailing Oct. 20, 2021, 8 pages.

Japanese Office Action for Application No. 2023-502772, dated Nov. 1, 2024, 4 pages, English translation.

* cited by examiner

APPARATUS AND METHOD FOR THE PRODUCTION AND FILLING OF CONTAINERS DESIGNED TO CONTAIN FOOD

CROSS-REFERENCE TO RELATED APPLICATIONS

The present application is a 35 U.S.C. § 371 National Stage patent application of International patent application PCT/IB2021/056288, filed on 13 Jul. 2021, which claims priority to Italian patent application 102021000002801, filed on 9 Feb. 2021, and Italian patent application 102020000017290, filed on 16 Jul. 2020, all of which are incorporated by reference in their entirety herein.

TECHNICAL FIELD

The present disclosure relates to an apparatus and a method for the production and filling of containers designed to contain food.

BACKGROUND

Typically, methods for the production and filling of foods provide for the following steps:
- a step of forming a sheet (normally made of PS or polystyrene) to provide a plurality of accommodation receptacles which have at least one access opening;
- a step of filling, through the access opening, the receptacles with at least one type of food;
- a step of sealing the access opening by means of a closure film or sheet unwound from a roll;
- a step of cutting, by means of blades or cutters, groups of receptacles;
- a step of providing respective weakening and separation portions at the connecting edges between at least two adjacent accommodation receptacles of the same group.

The step of providing the weakening portions is also performed by using blades or cutters which normally operate to provide an incision at the connecting edge.

This type of method, as well as the apparatuses used, have two types of drawbacks: the use of cutting blades or cutters to perform splitting into groups is not particularly flexible and it is rather complex, at the apparatus level, to vary the dimensions of the groups or the extension of the weakening portions. Other problems add to these, especially if one wishes to replace PS with PET or with PP in order to provide the containment receptacles.

In this case, in fact, a significant reduction of the lifespan of the blades or cutters is observed, with a considerable increase in the costs to be borne.

Furthermore, if one uses PET or PP as material, be they transparent or colored, since they are characterized by greater tenacity it is practically impossible to provide weakening portions capable of allowing mutual separation of the various receptacles by mutual bending without using scissors or cutters.

In particular, PET in sheet form (i.e., in plates having a thickness of more than 250 microns) having an initial degree of crystallinity up to 10%, is a resilient and tough material and accordingly, in order to generate by means of an incision with cutters the weakening portion at a connecting edge between at least two different accommodation receptacles it is necessary to go in the direction of systems in which the cutters are mutually closer and must produce an incision of substantially all of the thickness of the material; despite this, achievement of the intended aim is still not ensured.

Moreover, this aspect causes a shorter lifespan of the cutters for application on PET and consequently a higher cost to be borne.

Finally, the process becomes difficult to replicate.

SUMMARY

The aim of the present disclosure is to provide an apparatus and a method for the production and filling of containers designed to contain food that is capable of improving the background art in one or more of the aspects indicated above.

Within this aim, the disclosure provides an apparatus and a method for the production and filling of containers designed to contain food that allows a reduction of maintenance costs.

the disclosure also provides an apparatus and a method for the production and filling of containers designed to contain food that is extremely flexible and makes it possible to vary easily the shape of the groups of mutually connected containers and of the weakening portions.

Not the least of the disclosure is to provide an apparatus and a method for the production and filling of containers designed to contain food that is highly reliable, relatively easy to provide and has competitive costs, and maintains high industrial productivity, which currently is specific to the provision of containers made of PS.

This aim, as well as these and other advantages which will become more apparent hereinafter, are achieved by providing an apparatus and a method for the production and filling of containers designed to contain food according to the independent claims, optionally provided with one or more of the characteristics of the dependent claims.

BRIEF DESCRIPTION OF THE DRAWINGS

Further characteristics and advantages of the disclosure will become more apparent from the description of a preferred but not exclusive embodiment of the apparatus and method for the production and filling of containers designed to contain food according to the disclosure, illustrated by way of non-limiting example in the accompanying drawings, wherein.

DETAILED DESCRIPTION OF THE DRAWINGS

Figure 1:
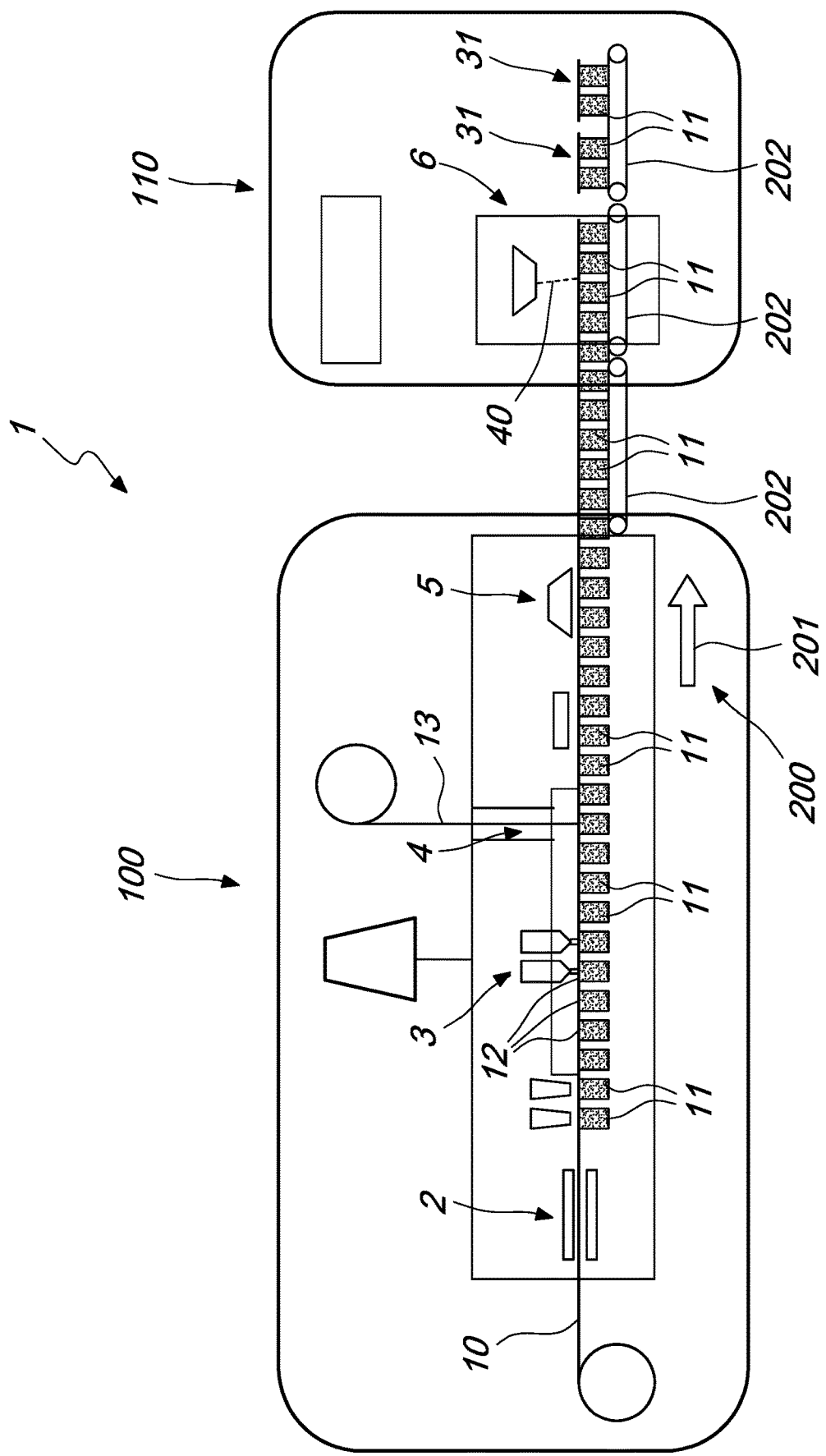
FIG. 1 is a schematic view of an apparatus for the production and filling of containers designed to contain food, according to the present disclosure.
Figure 2:
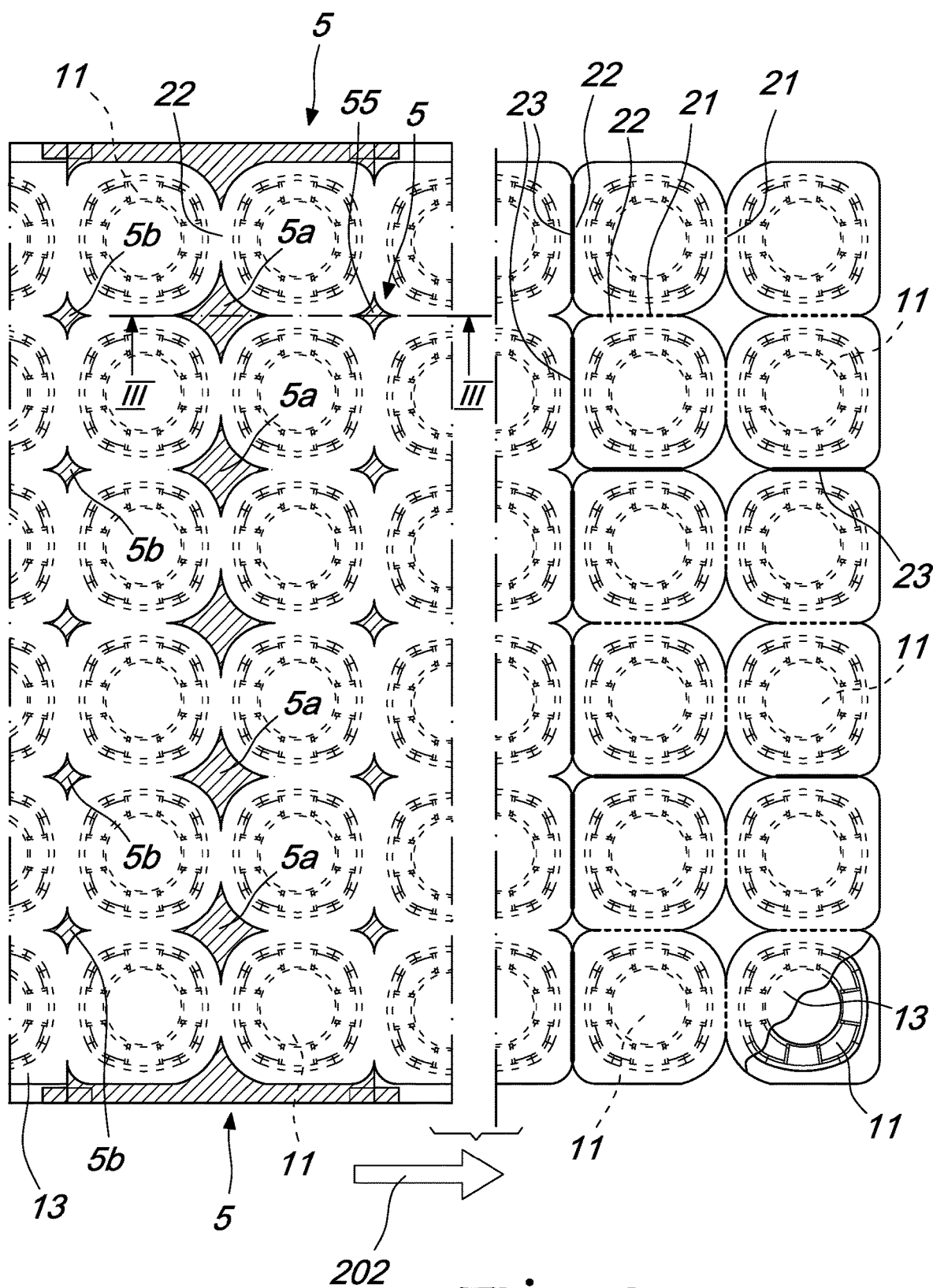
FIG. 2 is a sectional top view of the apparatus at the device for removing the portions to be removed.

With reference to the figures, the apparatus for the production and filling of containers designed to contain food, generally designated by the reference numeral 1, comprises at least one device 2 for forming a sheet 10 made of polymeric material in order to provide a plurality of accommodation receptacles 11 which have at least one access opening 12, at least one filling unit 3 adapted to fill, through the respective access opening 12, the accommodation receptacles 11 with at least one type of food, and at least one sealing unit 4, which is adapted to seal the access opening 12 by means of a closure film 13.

According to the present disclosure, the apparatus 1 comprises at least one device 5 for removing a plurality of portions to be removed, and at least one laser emitter 6 for providing a weakening portion 21 at a connecting edge 22 between at least two adjacent accommodation receptacles 11.

Conveniently, the portions to be removed comprise angular connecting portions 50 formed between the respective contiguous accommodation receptacles 11.

The portions to be removed may also comprise lateral portions which are extended in a longitudinal direction.

In particular, the polymeric material is constituted by a material with high tenacity.

Preferably, the polymeric material used is chosen in the group comprising:

PET (polyethylene terephthalate);

PP (polypropylene) and copolymers thereof.

According to a preferred embodiment, the apparatus 1 comprises a first section 100, which accommodates the at least one filling unit 3, the at least one sealing unit 4 and the at least one device 5 for removing a plurality of portions to be removed, and in particular for removing the angular connecting portions 50, and a second section 110, which accommodates the at least one laser emitter 6.

In particular, the second section 110 is separate from the first section 100.

In particular, the separation between the first section 100 and the second section 110 is ensured by a separation wall or partition which allows the crossing of the accommodation receptacles 11 but is capable of isolating the atmospheres in which the devices that are present respectively in the first section 100 and in the second section 110 operate.

This makes it possible to provide a region, constituted by the section 110, in which there is no humidity caused by the filling and optional cleaning operations, and in which the laser emitter 6 can operate under optimum conditions.

The second section 110 is arranged downstream of the first section 100 with respect to the movement flow of the accommodation receptacles 11.

The apparatus 1 is provided with a movement device 200 known per se for the transfer of the accommodation receptacles 11 along a movement direction 201 from the first section 100 to the second section 110.

Such movement device 200, for example constituted by belts 202, is configured to transfer the containment receptacles from the forming device 2 to the filling unit 3, to the sealing unit 4, and to the device 5 for removing the plurality of portions to be removed, and in particular for removing the angular connecting portions 50.

Advantageously, the device 5 for removing a plurality of angular connecting portions 50 comprises a die-cutting unit 5a or a punching unit 5b.

Figure 3:
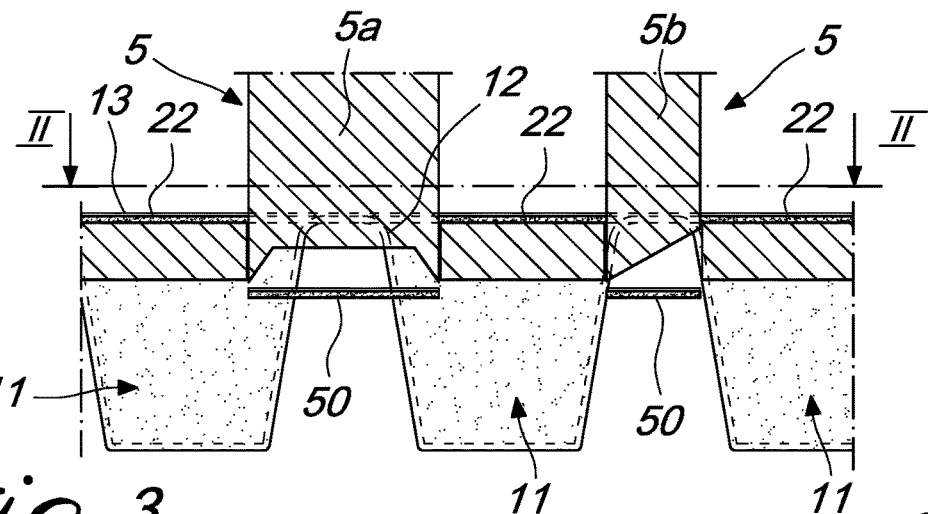
FIG. 3 is a sectional view, taken along the plane of arrangement defined by the line of FIG. 2.
Figure 4:
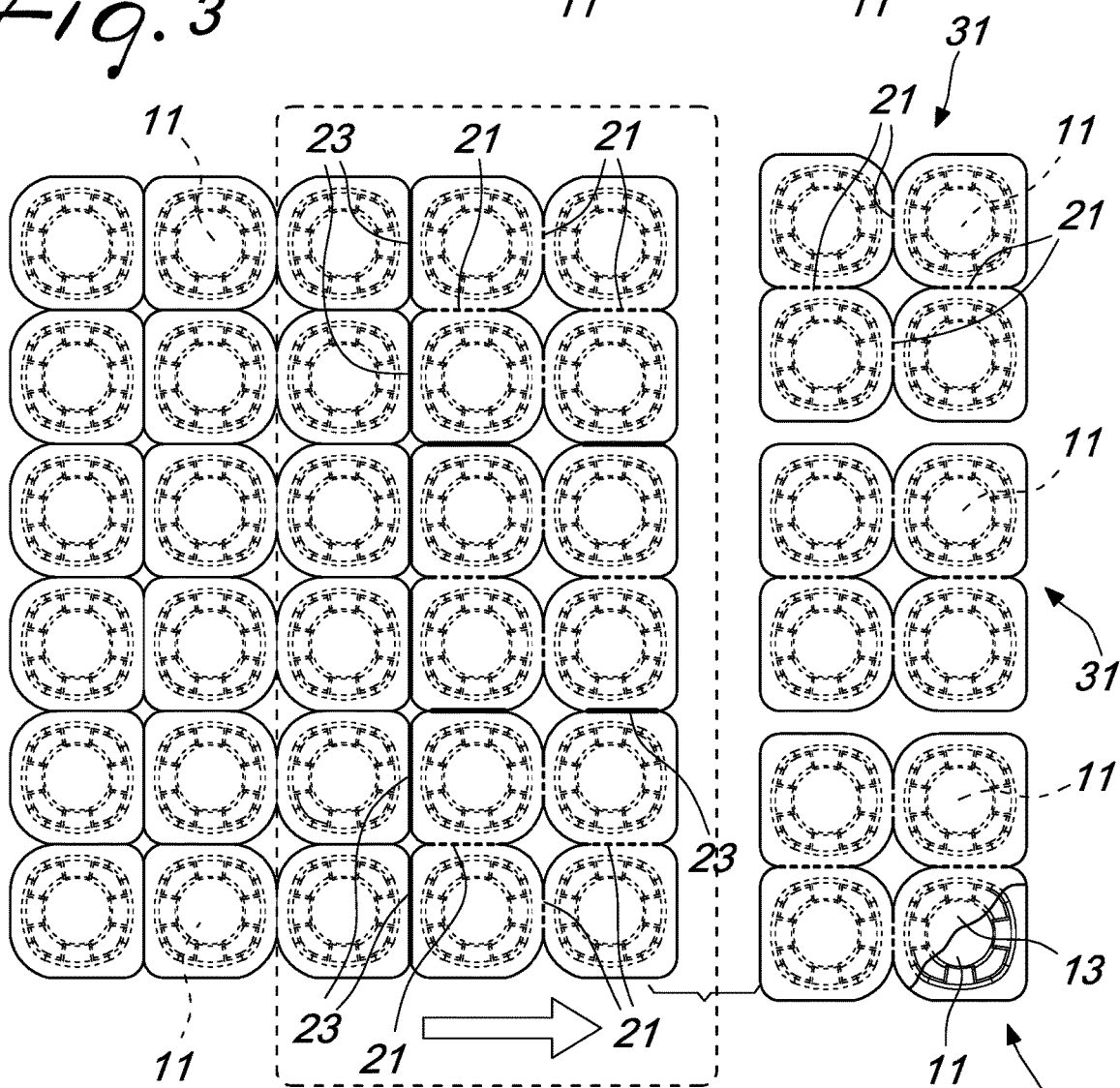
FIG. 4 is a top view of the containers at the laser emitter.

Specifically, the device 5 is provided with tools, constituted for example by a die-cutter or a punch, which can move on command along a working direction which is substantially perpendicular to the plane of arrangement of the angular connecting portions 50 to be removed, such tools being designed to penetrate within the material in order to protrude below the plane of arrangement of the angular connecting portions 50 to be removed, cutting and discharging downward the portions to be removed, and in particular the removed angular connecting portions 50 (as shown in the sectional view of FIG. 3).

Advantageously, the laser emitter 6 emits at a wavelength that is at least partly absorbed by the polymeric material.

By way of example, it is possible to use a $CO_2$ laser with a wavelength equal to 10.6 microns, 10.2 microns or 9.3 microns. The laser emitter 6 is configured to provide a localized reduction of the transverse cross-section of the connecting edge 22 along a weakening portion 21.

Localized reduction of transverse cross-section one is understood to mean a reduction of the cross-section of the connecting edge 22 that is substantially constant along the longitudinal extension of the weakening portion 21, but also the provision of a plurality of openings which pass through the connecting edge and are mutually spaced so as to provide the weakening portion 21.

Furthermore, the reduction of the cross-section along the connecting edge 22 may also have through openings interleaved by a constant reduction of the thickness or by reduction sequences of different thicknesses.

By way of example, the localized reduction of the transverse cross-section is at least equal to 50%, preferably at least equal to 70%, and even more preferably at least equal to 80% with respect to the initial cross-section.

Of course, nothing forbids providing different percentages of reduction of the transverse cross-section in order to obtain a different breaking strength.

The apparatus 1 comprises an apparatus for separating the accommodation receptacles 11 into groups 31.

Advantageously, respective weakening portions 21 are formed between the adjacent accommodation receptacles 11 of the same group 31.

Conveniently, the thickness of the connecting edge 22 on which the step of providing the weakening portion 21 is to be performed is comprised between 300 microns and 1800 microns and more preferably between 700 microns and 1300 microns.

According to a preferred practical embodiment, the separation apparatus comprises a laser emitter 6.

In this case, the laser emitter 6 or the laser emitters 6, accommodated in the second section 110, is or are configured to provide both the weakening portions 21 and the cuts 23 at connecting edges between the containment receptacles 11 in order to provide the groups 31.

The apparatus 1 may comprise, upstream of the device 5 for removing a plurality of portions to be removed, a first magazine for the storage of the sealed accommodation receptacles 11.

In addition, or as an alternative, the apparatus 1 can have, upstream of the at least one laser emitter 6, a second storage magazine.

The apparatus 1 may furthermore have, between the first section 100 of the apparatus 1 and the second section 110 of the apparatus 1, an intermediate storage magazine.

The storage magazines, to be understood as first storage magazine, second storage magazine and intermediate storage magazine, can be constituted by regions provided within the same environment in which the other devices of the apparatus 1 are arranged. Nothing forbids, in any case, locating the storage magazines within different regions which are separate from the regions in which the various devices of the apparatus 1 are arranged.

Furthermore, the various devices that compose the apparatus 1 can be located in different environments, locations or industrial buildings.

For example, the first section 100 and the second section 110 might be arranged in different industrial buildings or in regions of the same industrial building which are mutually distant.

The device for the separation of the accommodation receptacles 11 into groups 31 can be arranged in various positions along the extension of the apparatus 1.

For example, the separation device can be arranged upstream of the device 5 for removing a plurality of portions to be removed.

In this manner it is possible to provide the groups 31 directly and then perform on them, by virtue of the device 5, the removal of the plurality of portions to be removed and to provide the weakening portions by means of the laser emitter.

Furthermore, the device for separating the accommodation receptacles 11 into groups 31 may also be arranged between the device 5 and the laser emitter 6 in order to provide at least one weakening portion 21.

Finally, as already explained, the device for separating into groups 31 can be arranged downstream of the laser emitter 6 and of the device 5 in order to provide the weakening portions 21.

According to a further aspect, the present disclosure relates to a method for the production and filling of containers designed to contain food, comprising:
- a step of forming a sheet 10 made of polymeric material in order to provide a plurality of accommodation receptacles 11 which have at least one access opening 12;
- a step of filling, through the access opening 12, the accommodation receptacles 11 with at least one type of food;
- a step of sealing the access opening 12 by means of a closure film 13;
- a step of removing by die-cutting or punching a plurality of portions to be removed;
- a step of providing at least one weakening portion 21 at a respective connecting edge 22 between at least two contiguous accommodation receptacles 11, the provision step comprising a step of emitting laser radiation 40 at at least one portion of the connecting edge 22 in order to provide a localized reduction of the transverse cross-section of the connecting edge 22 along the weakening portion 21;
- a step of separating the accommodation receptacles 11 into groups 31 of accommodation receptacles 11.

The portions to be removed during the removal step comprise at least respective angular connecting portions 50 formed between respective contiguous accommodation receptacles 11.

Furthermore, the portions to be removed may also comprise lateral portions which are extended in a longitudinal direction.

The polymeric material is preferably a polymeric material with high tenacity.

Conveniently, the polymeric material is chosen from the group comprising:
- PET (polyethylene terephthalate);
- PP (polypropylene) and its copolymers.

Conveniently, as regards PP, the polymeric material comprises PP in its copolymers.

Advantageously, the separation step is performed by means of a laser beam designed to perform respective cuts 23 at connecting edges between the containment receptacles 11.

Conveniently, the thickness of the connecting edge 22 is comprised between 300 microns and 1800 microns.

More preferably, the sheet made of polymeric material comprises a sheet made of PET which has an initial degree of crystallinity of less than or equal to 10%.

Preferably, the sheet 10 made of PET comprises a sheet made of transparent PET.

Nothing forbids using a sheet made of transparent PP.

At the end of the method according to the disclosure, one obtains groups (known as multipacks) 31 of accommodation receptacles 11; respective weakening portions 21 are formed between mutually adjacent accommodation receptacles 11 of the same group 31 and are adapted to allow the separation of each accommodation receptacle 11 from the other accommodation receptacles 11 of the same group 31.

The use of a laser to provide the weakening portions 21 allows the method according to the disclosure to be enormously flexible, being easily programmable if the dimensions of the accommodation receptacles 11 or the shape of the groups 31 or the geometric characteristics of the weakening portions 21 change.

Furthermore, the method according to the disclosure provides for a sterilization step which is performed upstream or downstream of the thermoforming step.

The method further provides for performing, in the emission step, a step of extraction of the fumes and of the volatile substances.

This extraction step makes it possible to eliminate from the emission region the fumes, the volatile substances, but at the same time improves the efficiency of the action of the laser.

According to the present disclosure, it is possible to provide for the use of mass pigments and colors which remove or reduce the transparency of the finished sheet made of PET or PP and copolymers thereof.

Moreover, nothing forbids using polymeric materials, for example PET, which are recycled or partially recycled.

Nothing forbids providing for the use also of different polymeric materials with different tenacity, such as for example PS (polystyrene).

In practice it has been found that the disclosure achieves the intended aim and advantages, providing an apparatus and a method which are extremely flexible and capable of allowing the provision of weakening portions even on containers made of particularly high-tenacity polymeric material, which allow a practical and simple mutual separation of the containers.

Furthermore, the solution found is easy to implement starting from known systems currently used to provide for example groups of containers for foods made of PS (polystyrene).

It is in fact possible to adapt the cutting assembly normally used, for example by lifting the cutters, to allow the removal of the portions to be removed, and to add downstream of the apparatus the second section 110 which accommodates the laser emitter 6 in order to obtain the apparatus 1 according to the disclosure.

The invention thus conceived is susceptible of numerous modifications and variations, all of which are within the scope of the accompanying claims; all the details may furthermore be replaced with other technically equivalent elements.

In practice, the materials used, as long as they are compatible with the specific use, as well as the contingent shapes and dimensions, may be any according to the requirements and the state of the art.

In practice it has been found that the disclosure achieves the intended aim and advantages, providing a method that is extremely flexible and capable of allowing the provision of weakening portions even on containers made of high-tenacity polymeric materials such as PET or PP, which allow a practical and simple mutual separation of the containers.

The invention claimed is:
1. An apparatus for the production and filling of containers designed to contain food, the apparatus comprising:

at least one device for forming a sheet made of polymeric material in order to provide a plurality of accommodation receptacles which have at least one access opening, at least one filling unit adapted to fill, through said access opening, said accommodation receptacles with at least one type of food, at least one sealing unit adapted to seal said access opening by means of a closure film, and further comprising at least one device for removing a plurality of portions to be removed from the sealed accommodation receptacles, and at least one laser emitter for providing at least one weakening portion at a respective connecting edge between at least two adjacent accommodation receptacles, said polymeric material being chosen from the group consisting of:
PET (polyethylene terephthalate);
PP (polypropylene) and copolymers thereof,
said apparatus comprising a first section which accommodates said at least one filling unit, said at least one sealing unit and said at least one device for removing a plurality of portions to be removed, and a second section which accommodates said at least one laser emitter, said second section being separate from said first section.

2. The apparatus according to claim 1, wherein said portions to be removed comprise respective angular connecting portions formed between said respective contiguous accommodation receptacles.

3. The apparatus according to claim 1, further comprising, upstream of said at least one device for removing a plurality of portions to be removed, a first magazine for storing said accommodation receptacles sealed by said at least one sealing unit.

4. The apparatus according to claim 1, further comprising, upstream of said at least one laser emitter, a second storage magazine.

5. The apparatus according to claim 1, further comprising, between said first section and said second section, an intermediate storage magazine.

6. The apparatus according to claim 1, wherein said device for removing a plurality of portions to be removed comprises a die-cutting unit or a punching unit.

7. The apparatus according to claim 1, wherein said laser emitter is configured to provide a localized reduction of a transverse cross-section of said connecting edge along said weakening portion.

8. The apparatus according to claim 1, further comprising a device for separating said accommodation receptacles into groups, respective weakening portions being formed between adjacent accommodation receptacles of a same group of said groups.

9. The apparatus according to claim 8, wherein said device for separating said accommodation receptacles into groups is arranged upstream of said at least one device for removing a plurality of portions to be removed.

10. The apparatus according to claim 8, wherein said device for separating said accommodation receptacles into groups is arranged between said at least one device for removing a plurality of portions to be removed and said at least one laser emitter for providing at least one weakening portion.

11. The apparatus according to claim 8, wherein said device for separating said accommodation receptacles into groups is arranged downstream of said at least one laser emitter for providing at least one weakening portion.

12. The apparatus according to claim 8, wherein said device for separating said accommodation receptacles into groups comprises said laser emitter or an additional laser emitter.

13. A method for the production and filling of containers designed to contain food, the method including the following steps:
forming a sheet made of polymeric material in order to provide a plurality of accommodation receptacles which have at least one access opening,
filling, through said access opening, said accommodation receptacles with at least one type of food,
sealing said access opening by means of a closure film,
removing, by die-cutting or punching, a plurality of portions to be removed from the sealed accommodation receptacles,
providing at least one weakening portion at a connecting edge between at least two adjacent accommodation receptacles, said provision step comprising a step of emitting laser radiation at at least one portion of said connecting edge in order to provide a localized reduction of a transverse cross-section of said connecting edge along said weakening portion, and
separating the accommodation receptacles into groups of accommodation receptacles;
said polymeric material being chosen from the group consisting of:
PET (polyethylene terephthalate);
PP (polypropylene) and copolymers thereof;
providing an apparatus with a first section which accommodates structure to perform said step of filling, structure to perform said step of sealing and structure to perform said step of removing; and
providing said apparatus with a second section which accommodates structure to perform said step of emitting laser radiation, said second section being separate from said first section.

14. The method according to claim 13, wherein said portions to be removed during said step of removing comprise respective angular connecting portions formed between said respective accommodation receptacles.

15. The method according to claim 13, wherein said step of separating is performed by a laser beam designed to perform respective cuts at connecting edges between the accommodation receptacles.

16. The method according to claim 15, wherein a thickness of said connecting edge is comprised between 300 microns and 1800 microns.

17. The method according to claim 13, wherein said sheet made of polymeric material comprises a sheet made of PET or transparent PP.

* * * * *